US006752497B2

(12) United States Patent
Esser et al.

(10) Patent No.: US 6,752,497 B2
(45) Date of Patent: Jun. 22, 2004

(54) SINGLE VISION SPECTACLE LENS

(75) Inventors: Gregor Esser, Munich (DE); Helmut Altheimer, Baisweil (DE); Herbert Pfeiffer, Munich (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/168,156

(22) PCT Filed: Dec. 18, 2000

(86) PCT No.: PCT/DE00/04509

§ 371 (c)(1),
(2), (4) Date: Nov. 7, 2002

(87) PCT Pub. No.: WO01/44859

PCT Pub. Date: Jun. 21, 2001

(65) Prior Publication Data

US 2003/0174278 A1 Sep. 18, 2003

(30) Foreign Application Priority Data

Dec. 16, 1999 (DE) .......................................... 199 60 826

(51) Int. Cl.$^7$ ................................................ G02C 7/02

(52) U.S. Cl. ........................................ 351/159; 351/176
(58) Field of Search .................................. 351/159, 176

(56) References Cited

U.S. PATENT DOCUMENTS

| 4,613,217 A | 9/1986 | Fuerter et al. |
| 6,231,182 B1 | 5/2001 | Guilino et al. |

FOREIGN PATENT DOCUMENTS

| DE | 195 40 186 A1 | 4/1997 |
| EP | 0 560 999 B1 | 9/1993 |
| WO | 99/63392 A | 12/1999 |

*Primary Examiner*—Scott J. Sugarman
(74) *Attorney, Agent, or Firm*—Crowell & Moring LLP

(57) ABSTRACT

Described is a single vision spectacle lens for spherical or astigmatic prescriptions.

It is characteristic of the present invention that at least one surface is an atoroidal surface, and that along at least one line the refraction defect and the astigmatic defect for viewing angles of up to 40° are each smaller than ±0.15 dpt.

In the case of an astigmatic prescription the deviation of the cylinder axis or axis orientation from the prescribed cylinder axis or axis orientation is smaller than 1°.

13 Claims, 4 Drawing Sheets

SINGLE VISION SPECTACLE LENS

FIELD OF THE INVENTION

The invention relates to a single vision spectacle lens according to the preamble of the patent claim 1 or 2.

BACKGROUND OF THE INVENTION

A spectacle lens on which the wording of the preamble of the patent claim 1 has been based is known from the Example 7 of EP 0 560 999 A1. This spectacle lens has a rotationally symmetrical aspherical surface and an atoroidal surface.

EP 0 560 999 A1 is mainly concerned with reducing the lens thickness and the image defects of spectacle lenses having astigmatic power. However—as can be seen from FIGS. 21a and 21b of EP 0 560 999 A1—in the case of astigmatic defects as well as power deviations "residual defects" of at least 0.1 dpt remain on both principal meridians.

From DE 195 40 186 a spectacle lens with two aspherical surfaces is known, of which at least one is configured to be rotationally symmetrical. The object of the mentioned patent application is also to reduce the thickness and the image defects of a spectacle lens. However, the specification of this patent application expressly states that the image defects increase along the radial direction with the distance r from the vertex. With this, the image defects may attain values greater than 0.1 dpt at a 20 mm distance. Furthermore, there is no preferred direction along which the image defects are specifically corrected.

Reference is expressly made to both of the two above mentioned publications concerning an explanation of all details not described here more explicitly.

DESCRIPTION OF THE INVENTION

In accordance with the present invention it has been realized that it is possible to design a single power spectacle lens so that neither an astigmatic defect nor a deviation of power will occur along at least one line at a viewing angle of up to 40 degrees.

Thus it is the underlying object of the present invention to specify a spectacle lens which is well optimized as far as possible with respect to the astigmatic defect and/or the power deviation, wherein aspects of appearance, such as the curvature of the front surface, have not been over-looked but not been given primary consideration.

In particular, it is intended to correct astigmatic defects and refraction defects advantageously as far as possible with respect to all directions of viewing. In addition, the faces or surfaces of the spectacle lens are to be optimized to reduce the mentioned defects. At the same time nevertheless, any additional outlay is to be kept small.

An achievement of this object in accordance with the present invention is set out in the patent claims 1 and 2. Further developments of the invention are the subject matter of the dependent claims.

In accordance with the present invention it has been realized that a correction of both image defects, i.e. those of astigmatism as well as those of refraction, is not possible for all directions of viewing. This also applies when two aspherical surfaces are used. It is possible to correct either only the astigmatism or only the refractive defect for all angles of viewing. With a second aspherical surface only the properties relating to appearance, such as the thickness or the curvature of the front surface, may be further improved (see DE 195 40 186 A1).

It is therefore the basis of the invention that even if the image defects cannot be corrected for all angles of viewing, this can be done, as distinct from prior art, for one or more preferred directions.

In general, such a preferred direction is the horizontal and/or the vertical direction. However, it may also be any other desired direction according to the intended use (e.g. by golf players). For this, however, the image defects for the other viewing directions (up to 40 degrees of deviation) must not exceed any values which strongly impair the direct vision. These are values of, for example, 1.0 dpt.

In order to achieve this, at least one atoroidal surface is needed. The second surface may then be chosen as desired, but is preferably a rotationally symmetrical surface.

The atoroidal surface may be a surface having two or one or no planes of symmetry. If the preferred directions for the correction and the cylinder axis (axial orientation) of astigmatism do not coincide—which is relatively frequently the case—, then the atoroidal surface preferably no longer has any plane of symmetry.

Even with a purely spherical prescription, at least one atoroidal surface is needed, as distinct from prior art. Then either an atoroidal surface is used for which the vertex curvatures are the same—i.e. surface astigmatism occurs only outside the center or vertex—, which is to be preferred, or the—actually undesired—astigmatism at the vertex must be compensated with a second toroidal or atoroidal surface.

According to the invention it is of advantage for the number of lines specified in claim 1 to be greater than 1. The surfaces of the spectacle lenses may be additionally adapted according to the optical requirements. Also the shape as well as the position of the line or the lines can be advantageously conformed to the optical requirements.

BRIEF DESCRIPTION OF THE DRAWINGS

In the following the invention will be described by way of example without limitation of the general inventive concept with the aid of embodiments with reference to the drawings to which attention is expressly drawn concerning the disclosure of all details of the invention not described more explicitly in the text. Shown by FIG. 1a is the astigmatic defect of an embodiment "Spectacle Lens No. 1 according to the invention.

DESCRIPTION OF THE PREFERRED EMBODIMENTS

Figure 1A:
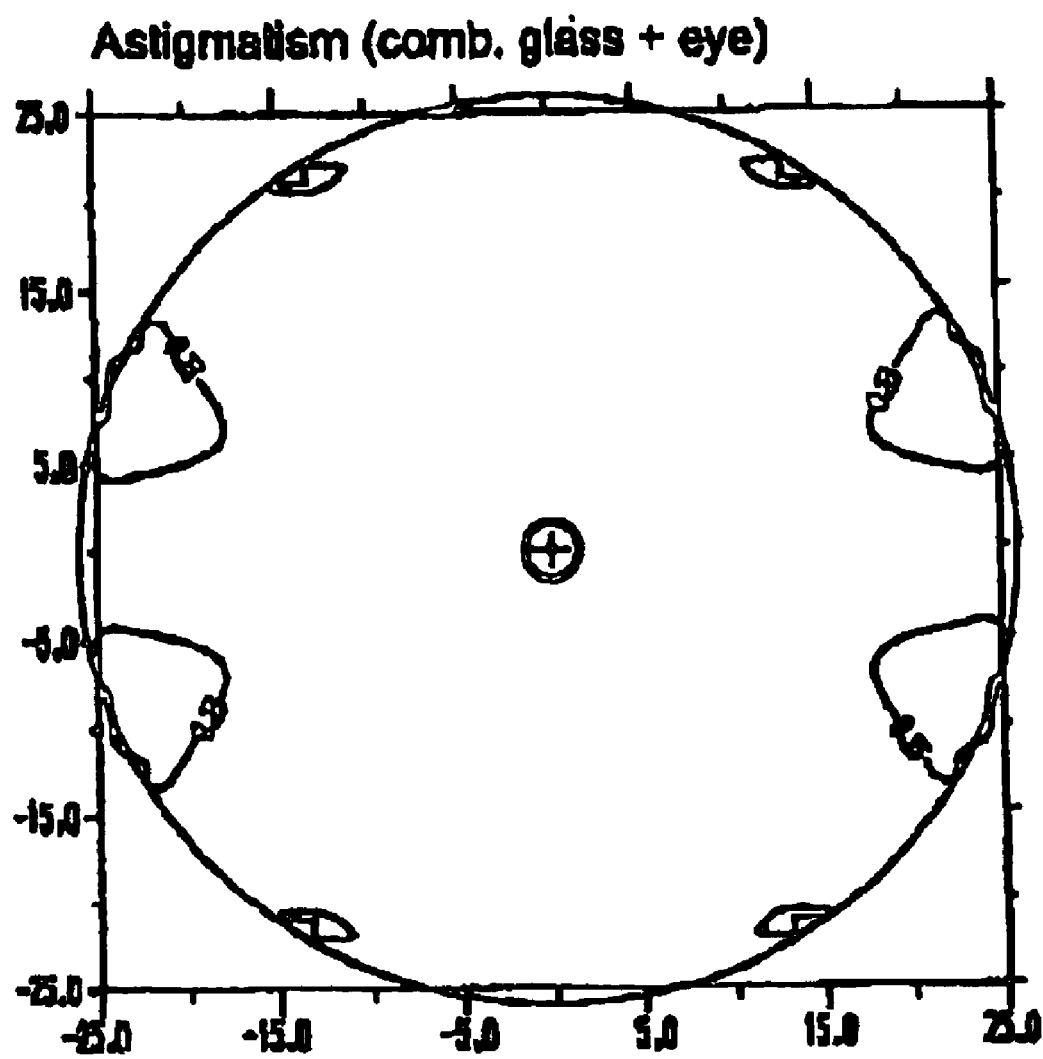
FIG. 1b is the refraction defect of the embodiment "Spectacle Lens No. 1" according to the invention.

According to the invention, at least one of the two surfaces of the spectacle lens, that is the front surface or the eye-facing surface, is an atoroidal surface. Such atoroidal surfaces can be described, for example, by means of the following mathematical approaches, wherein of course other approaches, such as approaches using spline functions, are also possible. The following approaches are therefore given only as a general explanation:

In the following explanations a Cartesian coordinate system is used without limitation of generality, wherein the x axis is oriented horizontally (in the position of use) and the y axis vertically. The z axis is perpendicular to the vertex of the spectacle lens, in which also the origin of the coordinates is located.

In the following the various possible cases of the design of a spectacle lens according to the invention are described, namely that of an atorus without any symmetry, or with one or two axes of symmetry.

---

Atorus without Symmetries

$$z(x, y) = \frac{r^2 c}{1 + \sqrt{1 - (1+\chi)r^2 c^2}} + \sum_{i=2}^{n} A_{2i} r^{2i}$$

z: Vertex height described by a conic section with additional terms wherein:
$r^2 = x^2 + y^2$   x, y: Coordinates $$c = c_1 \frac{x^2}{r^2} + c_2 \frac{y^2}{r^2}$$
$$= c_1 \cos^2\psi + c_2 \sin^2\psi$$

c: Vertex curvature
$c_1, c_2$: Principal curvatures
$\psi$: Azimuth $\chi = \chi(\psi)$ $\chi$: Conic section coefficient $$= \chi_0 + \sum_{k=1}^{l}(c_k \sin k\psi + d_k \cos k\psi)$$

$A_{2i} = A_{2i}(\psi)$

A: Additional terms $$= A_{2i,0} + \sum_{j=1}^{m}(e_{2i,j}\sin j\psi + f_{2i,j}\cos j\psi)$$

---

Another possible approach, in particular for an atorus with one plane of symmetry is:

---

$$z(x, y) = \frac{r^2 c}{1 + \sqrt{1 - (1+\chi)r^2 c^2}}$$

z: Vertex height
Conic section wherein:
$r^2 = x^2 + y^2$   x, y: Coordinates $$c = c_1 \frac{x^2}{r^2} + c_2 \frac{y^2}{r^2}$$
$$= c_1 \cos^2\psi + c_2 \sin^2\psi$$

c: Vertex curvature
$c_1, c_2$: Principal curvatures
$\psi$: Azimuth $\chi = \chi(\psi) = \frac{1}{4}(\chi_1 + \chi_2 + \chi_3 + \chi_4) +$ $\chi$: Conic section coefficient $\frac{1}{2}(\chi_2 - \chi_4)\sin\psi + \frac{1}{2}(\chi_1 - \chi_3)\cos\psi +$ $\frac{1}{4}(\chi_1 - \chi_2 + \chi_3 - \chi_4)\cos 2\psi +$ $A_2 \sin 2\psi + \sum_{k=1}^{n}\{A_{2k+2}\sin(2k+2)\psi +$ $A_{4k-1}[\sin(4k-1)\psi + \sin\psi] +$
$A_{4k+1}[\sin(4k+1)\psi - \sin\psi] + B_{4k}(\cos 4k\psi - 1) +$
$B_{4k+2}[\cos(4k+2)\psi - \cos 2\psi] +$
$B_{2k+1}[\cos(2k+1)\psi - \cos\psi]\}$

---

If an atorus having two planes of symmetry is used

---

$$z(x, y) = \frac{r^2 c}{1 + \sqrt{1 - (1+\chi)r^2 c^2}} + \sum_{i=2}^{n} I_{2i} r^{2i}$$

z: Vertex height
Conic section with additional terms wherein:
$r^2 = x^2 + y^2$   x, y: Coordinates $$c = c_1 \frac{x^2}{r^2} + c_2 \frac{y^2}{r^2}$$
$$= c_1 \cos^2\psi + c_2 \sin^2\psi$$

c: Vertex curvature
$c_1, c_2$: Principal curvatures
$\psi$: Azimuth $\chi = \chi(\psi)$ $\chi$: Conic section coefficient $$= \chi_1 \frac{x^2}{r^2} + \chi_2 \frac{y^2}{r^2} +$$

$$\sum_{k=1}^{l}\left[\left(\frac{x^2 - y^2}{r^2}\right) - 1\right]^{k}\left(a_{2k} + a_{2k+1}\frac{x^2 - y^2}{r^2}\right)$$

$$I_{2i} = I_{2i,1}\frac{x^2}{r^2} + I_{2i,2}\frac{y^2}{r^2} +$$

I: Additional terms $$\sum_{j=1}^{m}\left[\left(\frac{x^2 - y^2}{r^2}\right) - 1\right]^{j}\left(b_{2i,2j} + b_{2i,2j+1}\frac{x^2 - y^2}{r^2}\right)$$

---

A rotationally symmetrical asphere may be described as follows:

---

$$z(x, y) = \frac{1 - \sqrt{1 - (1+\chi)r^2 c^2}}{c(1+\chi)} + \sum_{i=2}^{n} I_{2i} r^{2i}$$

z: Vertex height
Conic section with additional terms wherein:
$r^2 = x^2 + y^2$
x, y: Coordinates
c: Vertex height
$\chi$: Conic section coefficient
I: Additional terms

---

The first embodiment "Spectacle Lens No. 1" is defined as follows:

A full correction is performed along the vertical and horizontal direction.

In the Example

| spherical prescription: | sph | −4.0 dpt |
| cylinder: | zyl | +1.0 dpt, and |
| axis orientation: | A | 0 degrees |

The front surface is a sphere having a vertex curvature D=1.91 dpt.

The rear surface is a case of an atorus having one plane of symmetry. The following values apply:

| | |
|---|---|
| n = 2, l = 2, m = 2, c1 = 11.79 dpt, c2 = 9.8 dpt, | |
| kappa1 = | −0.597189672229962 |
| kappa2 = | −5.76097881680865 |
| a2 = | 0.425927329384394D-001 |
| a3 = | 0.444201161488561D-001 |

-continued

| | |
|---|---|
| a4 = | 0.375517941270927D-001 |
| a5 = | 0.127887663998763D-001 |
| I2,1 = | −0.151595969823393D-006 |
| I2,2 = | 0.402179174652427D-006 |
| b2,2 = | −0.209816198640939D-006 |
| b2,3 = | −0.634206673176649D-007 |
| b2,4 = | −0.605531339980326D-007 |
| b2,5 = | −0.794011831309611D-007 |
| I4,2 = | 0.106397999616511D-009 |
| I4,3 = | −0.791028013692852D-011 |
| b4,2 = | −0.315538201137624D-010 |
| b4,3 = | −0.185092513672303D-010 |
| b4,4 = | −0.263190234501376D-010 |
| b4,5 = | −0.597727612074880D-011 |
| Glass data: | |
| Refractive index = | 1.502, |
| Center thickness = | 5.0 mm |

The second Example of Embodiment according to the invention "Spectacle Lens No. 2" is defined as follows:

A full correction is made along the vertical and horizontal direction.

| Prescription: | |
|---|---|
| sph | +3.0 dpt |
| cyl | +1.0 dpt |
| A | 0 degrees |

Front surface: rotationally symmetrical asphere with

| | |
|---|---|
| n = | 4. |
| c = | 9.52 dpt |
| kappa = | 4.33051940778317 |
| I1 = | −0.106601181782690D-005 |
| I2 = | −0.490037108005607D-010 |
| I3 = | −0.626005827177695D-013 |
| I4 = | −0.188711511368033D-016 |

Rear surface: Atorus without symmetries with

| | |
|---|---|
| n = | 2 |
| c1 = | 3.7 dpt |
| c2 = | 1.71 dpt |
| kappa1 = | −70.5339643507617 |
| kappa2 = | −303.892954849129 |
| kappa3 = | −70.6171394390323 |
| kappa4 = | −303.120828002937 |
| A2 = | 0.302644555982620 |
| A3 = | 0.201377303788072 |
| A4 = | −0.177484884515455D-001 |
| A5 = | −0.360085396588794D-001 |
| A6 = | 0.216477702374411D-002 |
| A7 = | −0.963938234393784D-001 |
| A8 = | −0.822772591258294D-001 |
| B3 = | −0.121704657579476D-001 |
| B4 = | 0.821433018833963D-003 |
| B5 = | 0.389643247516801 |
| B6 = | −31.7042633523933 |
| B7 = | −0.207846272892884 |
| B8 = | .4332302140801 |

-continued

| Glass data: | |
|---|---|
| Refractive index = | 1.502, |
| Center thickness = | 4.92 mm |

In the Figures the astigmatic defect and the refraction defect for both embodiments are shown:

FIG. 1*a* shows the astigmatic defect, i.e. the deviation of the astigmatism from the prescribed astigmatism, taking into consideration the cylinder axis or axis orientation of "Spectacle Lens No. 1". The line represents the 0.25 dpt isoline. It can be seen that the spectacle lens conforms to the prescribed values almost everywhere, in particular along the horizontal and vertical direction. Larger deviations are present only on the periphery outside the preferred directions.

Figure 1B:
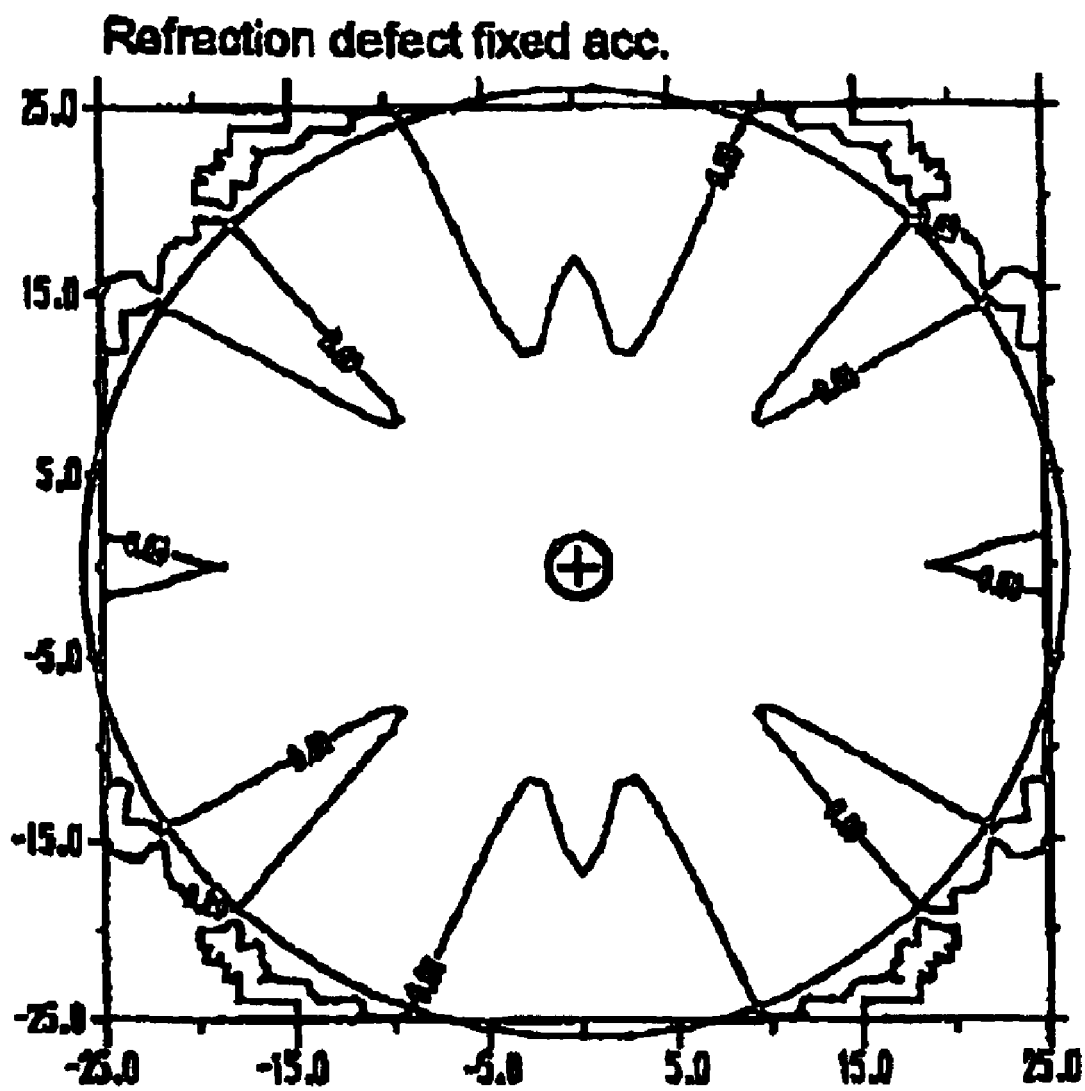

FIG. 1*b* shows the refraction defect, i.e. the deviation of the mean power from the prescribed mean power of "Spectacle Lens No. 1". It is seen that the deviations fluctuate around the value 0 everywhere.

Figure 2A:
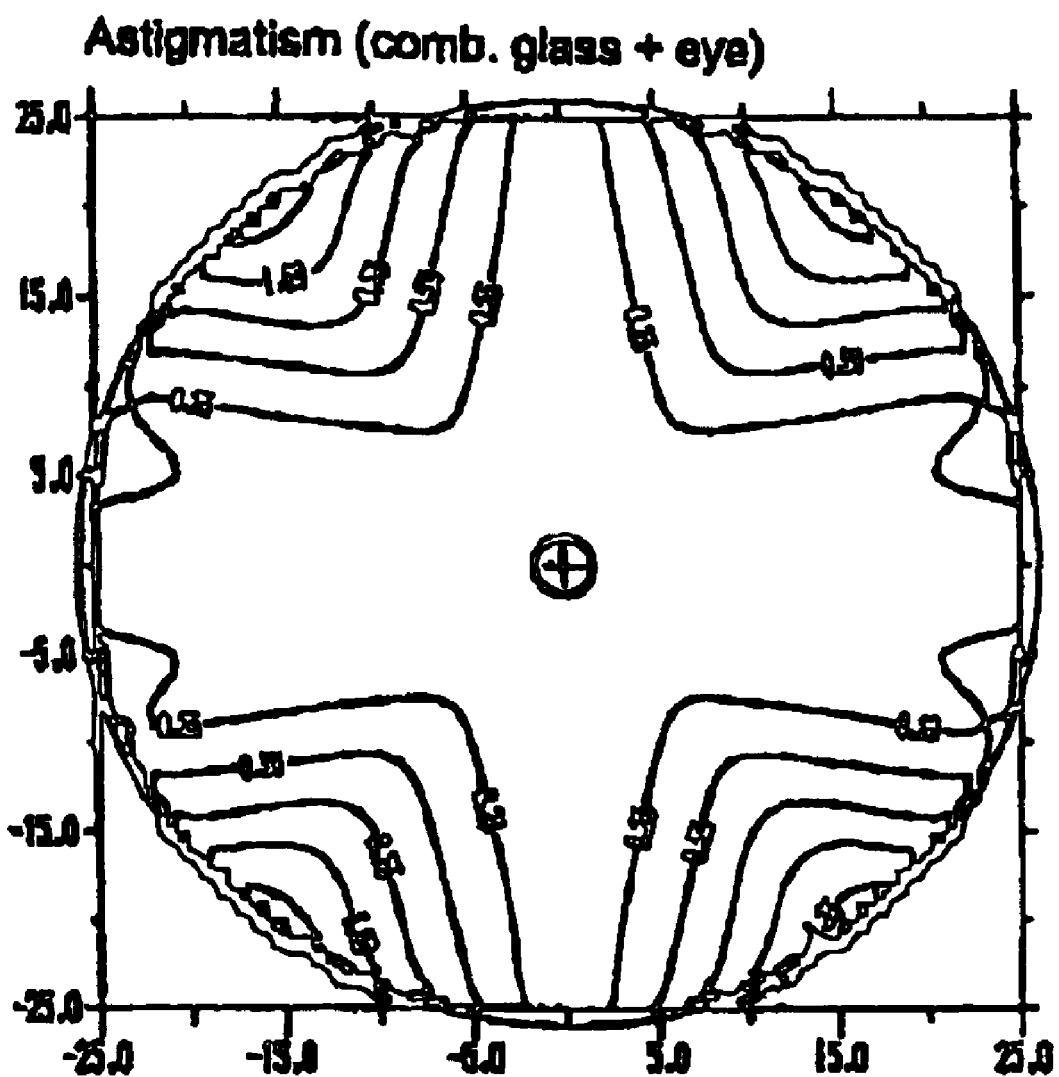
FIG. 2a is the astigmatic defect of an embodiment "Spectacle Lens No. 2" according to the invention.

FIG. 2*a* shows the astigmatic defect, i.e. the deviation of the astigmatism from the prescribed astigmatism, taking into consideration the cylinder axis or axis orientation for "Spectacle Lens No. 2". No deviations occur in the horizontal and vertical direction.

Figure 2B:
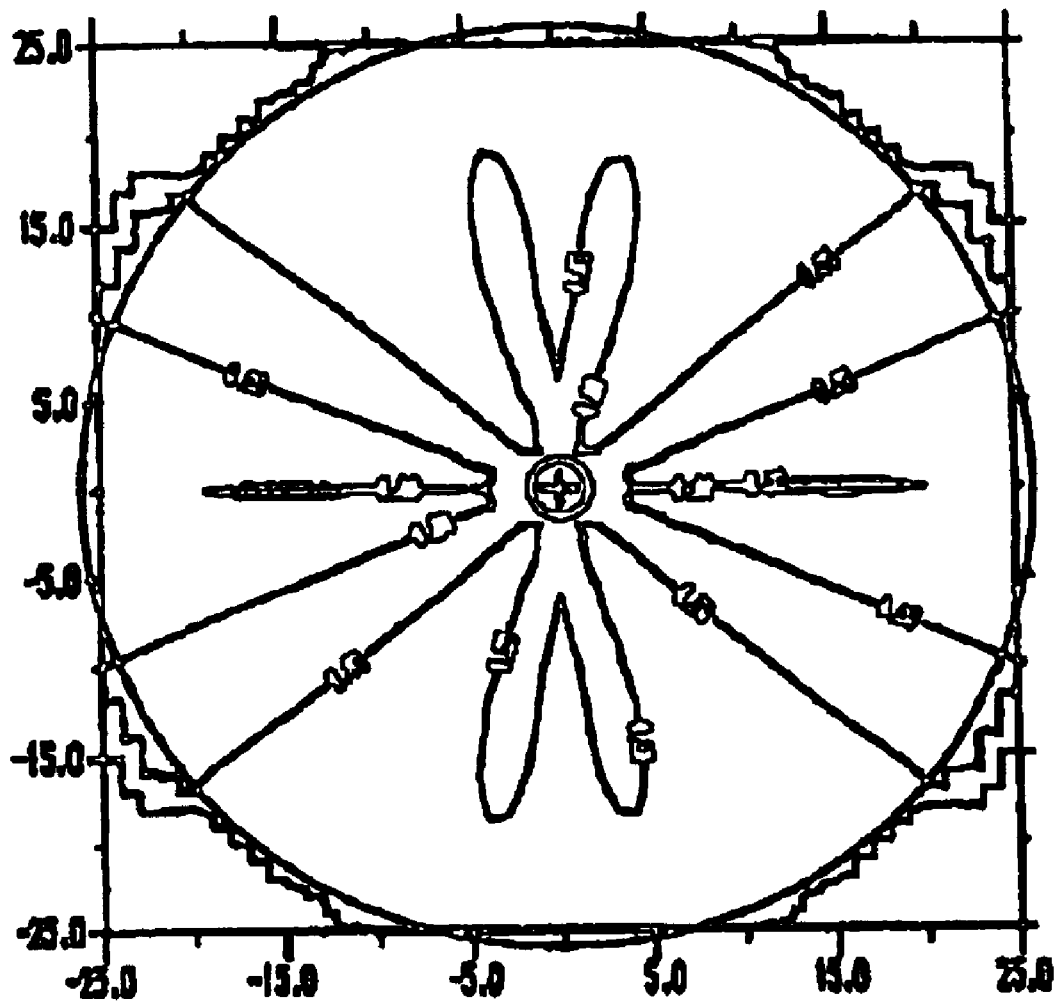
FIG. 2b is the refraction defect of the embodiment "Spectacle Lens No. 2" according to the invention.

FIG. 2*b* shows the refraction defect, i.e. the deviation of the mean power from the prescribed mean power of "Spectacle Lens No. 2" It can be seen that the deviations fluctuate around the value 0 everywhere.

The invention has been described above with the aid of embodiments without limitation of the general inventive concept which is evident from the claims and the general portion of the specification.

What is claimed is:

1. Single vision spectacle lens for spherical prescriptions, wherein at least one surface is an atoroidal surface, and that along at least one line the refraction defect and the astigmatic defect for viewing angles of up to 40° are each smaller than ±0.15 dpt.

2. Single vision spectacle lens according to claim 1, wherein at least two lines are present on the spectacle lens, for which the above conditions for the refraction defect, the astigmatic defect, and the deviation of the cylinder axis or axial orientation apply.

3. Single vision spectacle lens according to claim 1, wherein the deviations for the refraction defect and the astigmatic defect are +0.09 at maximum.

4. Single vision spectacle lens according to claim 1, wherein the second surface is a rotationally symmetrical aspherical surface.

5. Single vision spectacle lens according to claim 4, wherein the rotationally symmetrical aspherical surface is the front surface.

6. Single vision spectacle lens according to claim 1, wherein the line or lines are plane curves.

7. Single vision spectacle lens according to claim 6, wherein the lines are the principal meridians.

8. Single vision spectacle lens according to claim 1, wherein at least one of the lines lies in a horizontal or a vertical plane.

9. Single vision spectacle lens according to claim 1, wherein two lines are present which mutually form a right angle at their point of intersection.

10. Single vision spectacle lens according to claim 1, wherein the atoroidal surface has no plane of symmetry.

11. Single vision spectacle lens according to claim 1, wherein the vertex or apex heights of the principal meridians of the atoroidal surface are given by conic-section equations with additional terms.

12. Single vision spectacle lens according to claim 1, wherein the vertex or apex heights of the atoroidal surface are given by Spline functions.

13. Single vision spectacle lens for astigmatic prescriptions, wherein at least one surface is an atoroidal surface, and that along at least one line the refraction defect and the astigmatic defect for viewing angles of up to 40° are each smaller than ±0.15 dpt and the deviation of the cylinder axis or axis orientation from the prescribed cylinder axis or axis orientation is smaller than 1°.

* * * * *